No. 887,015. PATENTED MAY 5, 1908.
H. L. PIPPEN.
PEANUT GLEANER.
APPLICATION FILED MAY 11, 1907.
3 SHEETS—SHEET 1.
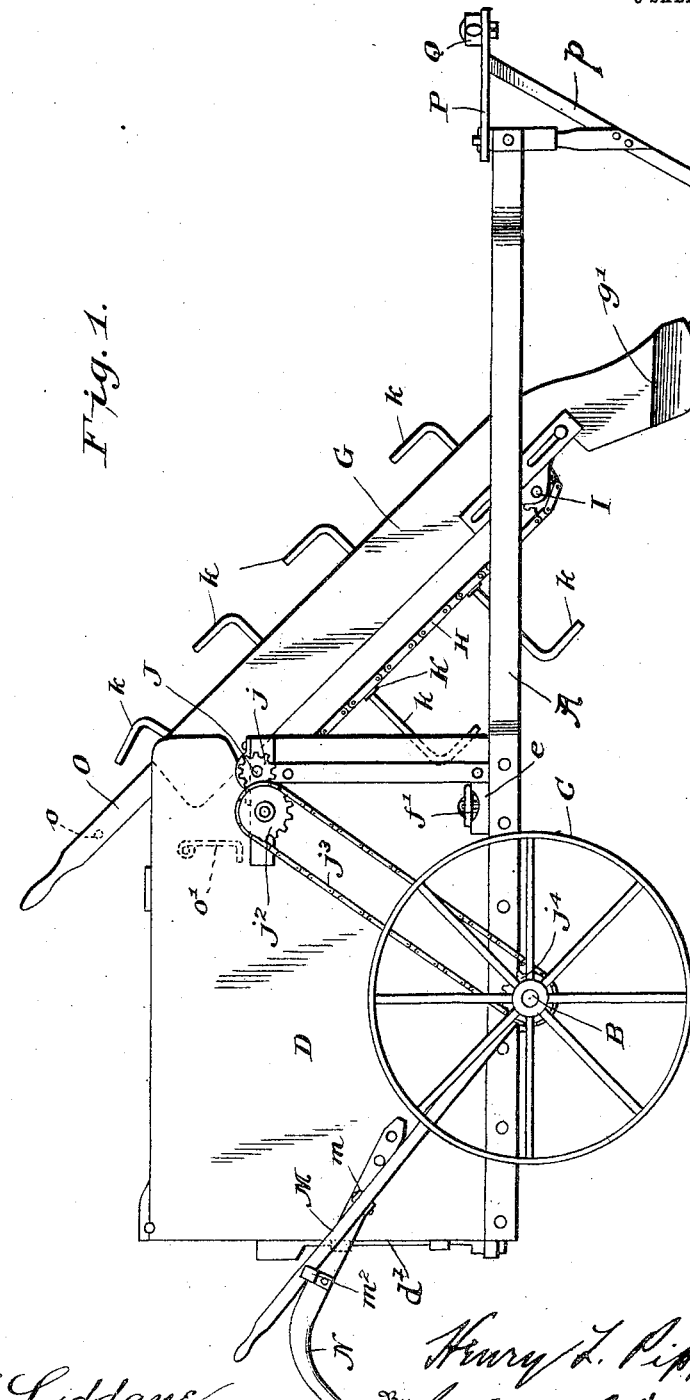

No. 887,015. PATENTED MAY 5, 1908.
H. L. PIPPEN.
PEANUT GLEANER.
APPLICATION FILED MAY 11, 1907.
3 SHEETS—SHEET 2.
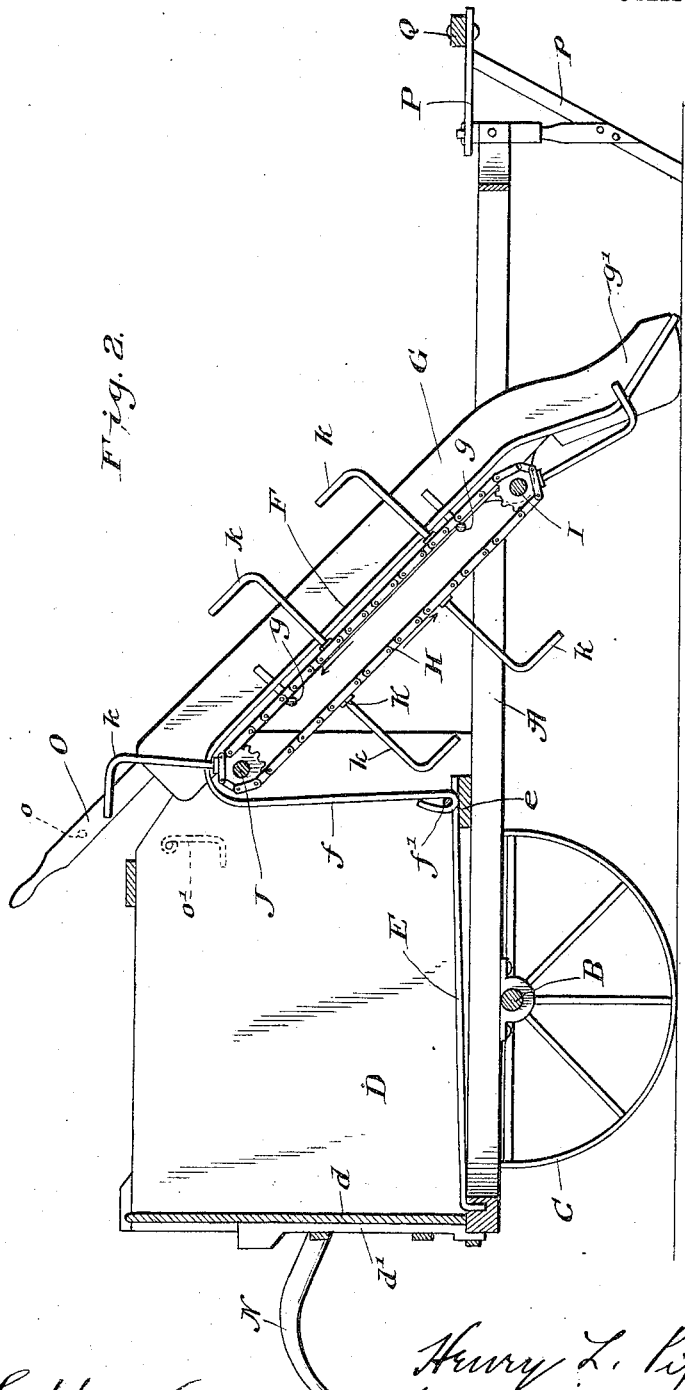

No. 887,015. PATENTED MAY 5, 1908.
H. L. PIPPEN.
PEANUT GLEANER.
APPLICATION FILED MAY 11, 1907.
3 SHEETS—SHEET 3.
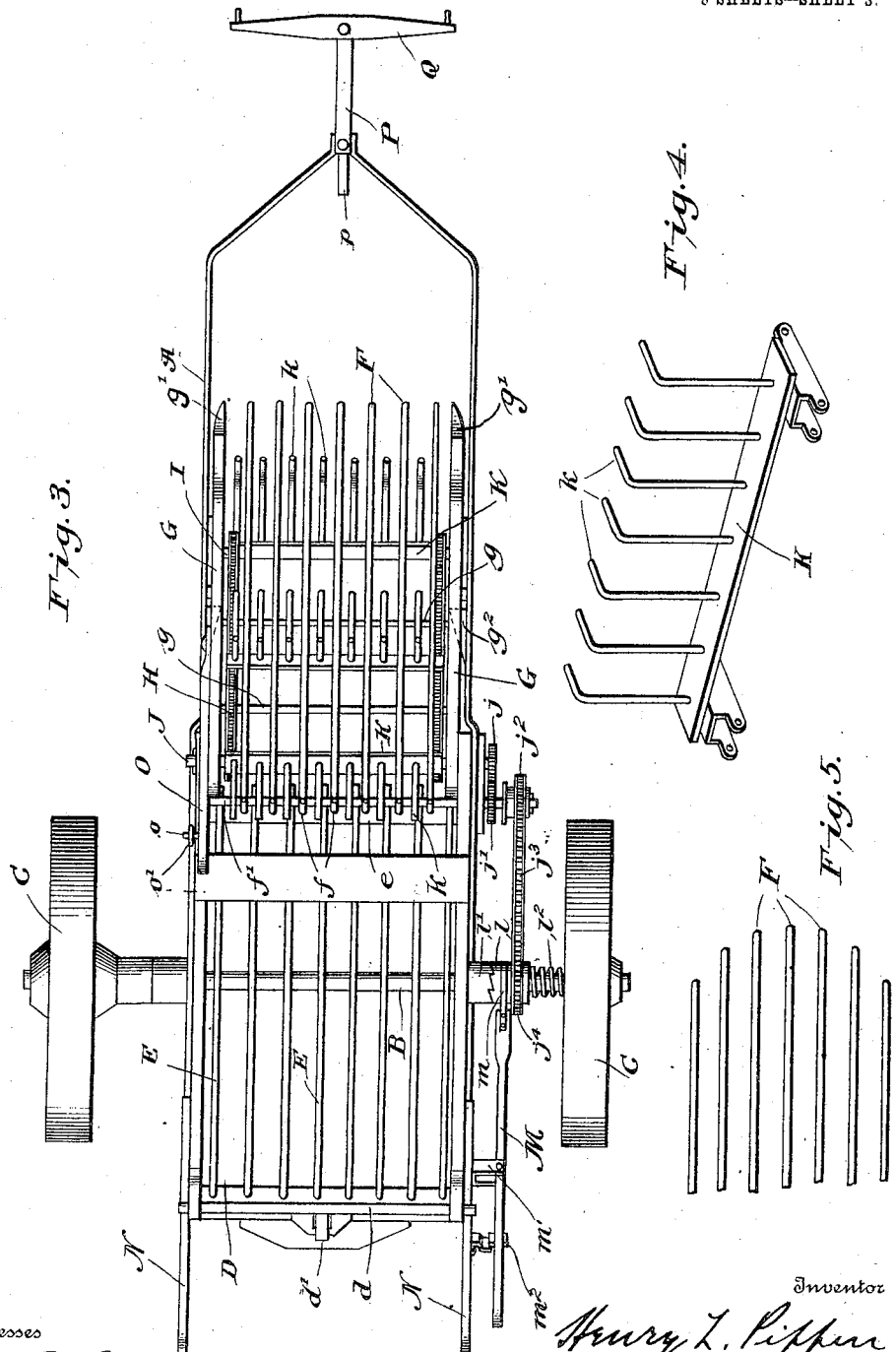

UNITED STATES PATENT OFFICE.

HENRY LAFAYETTE PIPPEN, OF WHITAKERS, NORTH CAROLINA.

PEANUT-GLEANER.

No. 887,015.     Specification of Letters Patent.     Patented May 5, 1908.

Application filed May 11, 1907. Serial No. 373,118.

*To all whom it may concern:*

Be it known that I, HENRY LAFAYETTE PIPPEN, a citizen of the United States, residing at Whitakers, in the county of Edgecomb and State of North Carolina, have invented certain new and useful Improvements in Peanut-Gleaners; and I do hereby declare the following to be a full, clear, and exact description of the invention, such as will enable others skilled in the art to which it appertains to make and use the same.

In gathering or harvesting peanuts there has always been considerable waste or loss on account of the large quantity of scattered or loose peanuts left on the ground or in the loose soil after digging and stacking. It is estimated that from one-fourth to one-half of an entire crop is frequently lost in this manner. This has been due, partly, to the difficulty of effectively gathering subsoil products of such diminutive sizes as peanuts, partly to the lack of proper implements and sufficient help, and largely on account of inefficient and careless labor on which planters and growers are usually compelled to rely.

The main object of my invention is to avoid the waste or loss above mentioned, and to assure the gathering of the entire crop.

To this end, my invention comprises a simple, practicable and efficient implement or machine, adapted to be moved or drawn over the rows or furrows after digging and to glean or pick up and collect any scattered or loose nuts remaining on the ground or in the soil. Said machine may be briefly described as a wheel-supported box or receptacle, having a downwardly and forwardly extending grate composed of a plurality of rods, the lower extremities of which pass along the ground and rake up the loose peanuts, and a plurality of traveling rakes which pick up the nuts gathered upon the grate and carry them upwardly and rearwardly and deposit them into the box or receptacle.

A suitable embodiment of my invention is illustrated in the accompanying drawings, which constitute a part of this specification.

The invention will hereinafter be fully described with reference to said drawings and then more particularly pointed out in the appended claims.

In said drawings: Figure 1 is a side elevation of the machine. Fig. 2 is a longitudinal vertical section thereof. Fig. 3 is a top plan view. Fig. 4 is a detail enlarged perspective view of one of the pick-up rakes. Fig. 5 is a detail plan view of a modification of the lower front end of the grate.

Referring to the drawings, A denotes a horizontally-disposed frame mounted rearwardly on the axle B of a pair of supporting and driving wheels C. On said frame, above the drive-wheels, is mounted a box or receptacle D to receive the peanuts picked up by the machine. The construction of the frame A and the box D may be of any appropriate character. Preferably the frame is constructed of metal, while the box is constructed with wooden sides mounted on the side-bars of the frame and with a rear tail-gate $d$ shown arranged between the sides of the box and pivoted or swung from the top thereof and provided with a fastening-bolt $d'$ which engages in a notch in the back of the frame A. The box has a grate-like bottom, which may be constituted by a series of rods E, spaced sufficiently close together to prevent the peanuts from dropping through while yet allowing the dirt and earth to drop through. The box has also a grate-like front, constituted by the rear vertically arranged portions $f$ of the grate-bars or rods F, referred to later.

In front of the box D, and between the side-bars of the frame A, is a downwardly and forwardly inclined frame comprising side-bars G rigidly connected by cross-rods $g$. The lower front ends of said side-bars G are adapted to run along on the ground or more or less in the loose soil, at opposite sides of the row or furrow, for which purpose said ends are shown as pointed shoes, indicated by $g'$. Said frame G supports an inclined grate comprising a plurality of rods or bars F, the lower front ends of which are adapted to pass over the ground or under the loose soil and rake or scoop up any scattered or loose peanuts concealed in the soil or on the ground. The rear portions $f$ of said rods F extend downwardly behind the frame E and constitute the aforesaid grate-like front for the box D; the lower extremities of said portions $f$ being shown looped around a cross-rod $f'$ which is secured above the front extremities of the rods E. Said rods E have their rear ends attached to the back of the frame A, and their front ends supported on or by a cross-bar $e$. The frame-bars G also support between them an endless carrier, comprising opposite sprocket-chains H engaging sprocket-wheels on cross shafts I and J. The lower and forward shaft I is journaled in suitable bearings carried by the side-bars G, said bearings being desirably adjustable to tension the carrier; while the rearward and upper shaft J is journaled in the opposite sides of the box D; and upon said shaft J the said side-bars G are loosely or pivotedly mounted for a purpose hereinafter explained. Said carrier-chains H carry a plurality of pick-up rakes, spaced at suitable intervals apart, and each comprising a cross-bar K attached to the chains and provided with projecting teeth $k$, the extremities of which teeth are perferably bent forwardly in the direction of motion of the carrier, which is indicated by the arrows in the drawings. The grate-rods F lie upon the cross-bars K of the pick-up rakes at the upper run of the carrier. Hence the upper run of the carrier, (traveling rearwardly and upwardly towards the box D) carries the cross-bars K under the grate-bars F, while the teeth $k$ ride between the grate-bars; and the lower run of the carrier carries the pick-up rakes wholly below the grate. In making the turns around the sprocket-wheels on the shafts H and I, the teeth of the pick-up rakes simply pass between the grate-bars. The function of these pick-up rakes is to take the peanuts gathered upon the lower portion of the grate F and carry them upwardly and rearwardly and deposit them into the box D. It is noted that the lower front portions of the grate-bars F are bent downwardly just beyond the shaft I and then forwardly, so that the forward extremities of the grate-bars will effectively rake or scoop up the peanuts and lodge them against the aforesaid downwardly bent portions of the grate-bars. The pick-up rakes passing below the grate come up under the downwardly bent portions of the grate-bars and pick up or catch the peanuts lodged thereagainst and carry them upwardly and rearwardly over the grate and deposit them into the box D.

The carrier for the pick-up rakes may be driven from either one of the wheels C, or from the axle B, the latter being revoluble and the wheels being rigidly mounted thereon. In the illustrated construction, the shaft J has a pinion $j$ meshing with a pinion $j'$ on a stub-shaft provided with a sprocket-wheel $j^2$. Said sprocket-wheel $j^2$ is engaged by a sprocket-chain $j^3$ which passes around a sprocket-wheel $j^4$ on the axle.

To permit throwing the machine in and out of gear, the sprocket-wheel $j^4$ is or may be loosely mounted on the axle B, and its hub is provided with a clutch-member $l$ which coacts with a clutch-member $l'$ fast on the axle, the two clutch-members being normally held in engagement by a suitable spring, shown as a coil-spring $l^2$ interposed between the hub of the wheel C and the sprocket-hub. The sprocket-hub or sleeve on which the sprocket is mounted has a grooved collar engaged by the fork $m$ of a throwout lever M shown pivoted to a lug or bracket $m'$ on one of the handles N at the side of the box D. When the machine is thrown out of gear, the lever M may engage with a notch in a suitable rack or bracket $m^2$ to hold the machine out of gear.

As before mentioned, the side-bars G, which support the grate F and the conveyer, are pivotally attached to the front of the box D. The purpose of this is to permit elevating or depressing the lower front portion of the grate and its supporting frame. For this purpose a handle O is shown attached to one of the side-bars G and is provided with a pin or projection $o$ adapted to be engaged by a hook $o'$ on one of the sides of the box D, so as to hold the front end of the grate and conveyer in an elevated position, or above the surface of the ground. Suitable abutments $q^2$ are provided for the lower sides of the side-bars G to limit the down position of the lower front end of said bars and the rack carried thereby.

In moving a machine to and from the field, or while it is not in operation of gleaning peanuts, the conveyer driving mechanism is desirably thrown out of gear in the manner above described, and the pin $o$ is engaged by the hook $o'$, so as to elevate the lower portion of the grate.

The front of the frame A is shown supported by the foot of a hold-up bar $p$ depending from a short tongue P which is pivotally attached to the front of the frame and is adapted to hold the whiffletree Q for attachment of the horse or team. Said bar $p$ supports the front of the machine at the proper elevation.

The operation of the machine will be understood from the foregoing description, taken in connection with the accompanying drawings. As pointed out, in operation, the lower front portions of the bars G, carrying the rods F and conveyer, are lowered by releasing the hook $o'$ so that the lower front ends of the rake-bars will pass along the ground or in the loose soil; and the conveyer driving mechanism is thrown into gear with the axle B by releasing the lever M from the notch in the bracket $m^2$. As the machine travels along the row or furrow, the lower front ends of the grate-bars F rake or scoop up the loose peanuts, and these are picked up and carried rearwardly over the grate-bars and deposited in the box D by means of the traveling pick-up rakes K.

The lower front ends of the grate-rods F may be of substantially the same lengths, where the machine is intended to work on level ground, or they may be of different lengths so as to form an arc or curve, as shown in Fig. 5, where the machine is intended to pass along a furrow, the middle and longer grate-rods being intended to pick up the peanuts from the bottom of the furrow. If desired, two sets of grate-rods may be furnished for each machine, and either set can be easily substituted for the other by virtue of the manner of arranging the grate-rods F in place in the machine; for which purpose the cross-rod $f'$ is preferably made detachable. Said rod $f'$ can be withdrawn from the box to permit detaching the grate-bars and can then be inserted to hold the new set of grate-bars when the latter are put in place.

If desired, a hopper or funnel, preferably of zinc or other sheet-metal, may be arranged in the box D so as to receive the peanuts as they are deposited by the pick-up rakes, and a bag can be attached to the bottom of the funnel or hopper so as to permit bagging the peanuts as they are gathered.

I claim as my invention and desire to secure by Letters Patent of the United States.

1. A peanut-gleaner comprising a wheel-supported receptacle, an inclined grate extending forwardly and downwardly from said receptacle, said grate composed of a plurality of grate-bars whose lower forward ends are adapted to contact directly with the ground and rake up loose peanuts, an endless carrier under the grate whose upper run travels rearwardly and whose lower run travels forwardly said carrier having a plurality of spaced transverse pick-up rakes with outwardly-extending teeth which pass between the grate-bars at the upper run and turns of the carrier, the front portions of said grate-bars beyond the front end of the carrier being bent downwardly and then forwardly, thereby providing a scoop-like rake for gathering peanuts and lodging them rearwardly against the downwardly-bent portions of said grate-bars, and the carrier being so arranged that the pick-up rakes when making their forward turn pass up under and between the downwardly-bent portions of the grate-bars and pick up the peanuts lodged thereagainst and carry them rearwardly over the grate to said receptacle.

2. A peanut-gleaner comprising a wheel-supported receptacle, an inclined grate extending forwardly and downwardly from said receptacle, said grate composed of a plurality of grate-bars whose lower forward ends are adapted to contact directly with the ground and rake up loose peanuts, an endless carrier under the grate whose upper run travels rearwardly and whose lower run travels forwardly, said carrier having a plurality of spaced transverse pick-up rakes with outwardly-extending elongated teeth which pass between the grate-bars at the upper run and turns of the carrier, the extremities of which teeth are bent forwardly in the direction of motion of the carrier, the front portions of said grate-bars beyond the front end of the carrier being bent downwardly and then forwardly, thereby providing a scoop-like rake for gathering peanuts and lodging them rearwardly against the downwardly-bent portions of said grate-bars, the carrier being so arranged that the pick-up rakes when making their forward turn pass up under and between the said downwardly-bent portions of the grate-bars, with the bent extremities of the rake-teeth passing just beyond said downwardly-bent portions, and the arrangement being such that the extremities of the rake-teeth when in their lowest position are at a substantial height above the ground.

3. A peanut-gleaner comprising a wheel-supported receptacle, a downwardly and forwardly inclined grate extending therefrom, said grate composed of a plurality of grate-bars whose lower forward ends are arranged to contact directly with the ground and rake up loose peanuts, the rear ends of said grate-bars extending downward and constituting a grate-like front for said receptacle, and an endless carrier under said grate whose upper run travels rearwardly and whose lower run travels forwardly, said carrier having a plurality of spaced transverse pick-up rakes with elongated outwardly-projecting teeth which pass between said grate-bars at the upper run and turns of the carrier, whereby said rake teeth pass up between the grate-bars from beneath the lower portion of the grate and pick up the peanuts gathered upon the grate and carry them rearwardly over the grate and into said receptacle, the said rake-teeth when making their rear turn passing between the rear downward extensions of the grate-bars constituting the front of said receptacle.

4. A peanut-gleaner comprising a wheel-supported receptacle, a downwardly and forwardly inclined frame extending therefrom comprising side-bars and connections between them, an endless carrier supported by said frame and whose upper run moves rearwardly, a driving-shaft for one end of said carrier arranged transversely in the upper front of said receptacle and on which said frame is pivotally mounted, said carrier provided with transverse rakes, a cross-rod arranged in the lower front of said receptacle, and rods attached thereto extending upwardly to provide a grate-like front for said receptacle and thence extending downwardly and forwardly over the upper run of said carrier, the teeth of which rakes pass between said rods which constitute a grate for scooping peanuts from the soil to be caught by said rakes, the arrangement being such that said frame together with the carrier and grate lying thereon can be rocked on said shaft for elevating the front lower end of the grate.

In testimony whereof I affix my signature, in presence of two witnesses.

HENRY LAFAYETTE PIPPEN.

Witnesses:
F. H. CUTCHIN,
J. C. BRASWELL.